Oct. 6, 1942.  C. A. JOHNSON  2,298,132
MEANS FOR FORMING HOLLOW STRUCTURES
Filed Oct. 11, 1940    8 Sheets-Sheet 1

INVENTOR.
CHARLES A. JOHNSON
BY
Irving Seidman
ATTORNEY

Oct. 6, 1942.    C. A. JOHNSON    2,298,132
MEANS FOR FORMING HOLLOW STRUCTURES
Filed Oct. 11, 1940    8 Sheets-Sheet 2

INVENTOR.
CHARLES A. JOHNSON
BY
Irving Seidman
ATTORNEY

Oct. 6, 1942.  C. A. JOHNSON  2,298,132
MEANS FOR FORMING HOLLOW STRUCTURES
Filed Oct. 11, 1940  8 Sheets-Sheet 5

INVENTOR.
CHARLES A. JOHNSON
BY
*Irving Seidman*
ATTORNEY

Oct. 6, 1942.  C. A. JOHNSON  2,298,132
MEANS FOR FORMING HOLLOW STRUCTURES
Filed Oct. 11, 1940  8 Sheets-Sheet 6

INVENTOR.
CHARLES A. JOHNSON
BY
Irving Seidman
ATTORNEY

Oct. 6, 1942.  C. A. JOHNSON  2,298,132
MEANS FOR FORMING HOLLOW STRUCTURES
Filed Oct. 11, 1940  8 Sheets-Sheet 8

INVENTOR.
CHARLES A. JOHNSON
BY
Irving Seidman
ATTORNEY

Patented Oct. 6, 1942

2,298,132

UNITED STATES PATENT OFFICE 2,298,132

MEANS FOR FORMING HOLLOW STRUCTURES

Charles A. Johnson, Brooklyn, N. Y., assignor of one-half to Irving Seidman, New York, N. Y.

Application October 11, 1940, Serial No. 360,779

3 Claims. (Cl. 113—42)

This invention relates to a method of and means for making hollow and tubular bodies and objects of predetermined form, and more particularly to a novel and efficient method of constructing airplane fuselages, wings, etc.

Broadly, it is an object of my invention to provide a cheap and simple method of making airplanes in which the independable factor of human skill is replaced by accurate mechanical devices and controls which combine to produce a light but sturdy all metal airplane of smooth exterior.

More specifically, it is an object of my invention to provide a method of manufacturing all welded metal airplanes by means of a simple split die in conjunction with other simple apparatus, thus eliminating the expensive male and female dies ordinarily used.

Another object of my invention is to produce a structure with welded joints or seams of maximum strength and ductility, such joints or seams being welded continuously throughout their entire length.

Another object of my invention is to provide a means for manufacturing all welded airplanes with an exterior free of the warping and distortion otherwise resulting from the intense heat generated in the welding operation.

Another object is to provide a means for forming in one operation the skin or shell of the wings and fuselage along with the fixed tail surfaces, while simultaneously cutting door, window, windshield, and other openings and access holes.

Still another object is to utilize this invention in conjunction with my co-pending application, Serial No. 361,551 to produce an all welded metal airplane of fewer and simpler parts than those used in other methods of airplane manufacture.

In other methods of airplane manufacture, the metal skin or shell is formed in sections, such sections being then connected together and to an interior structure or framework. Such connections are usually made by means of rivets or electric spot welding or a combination of such connecting means.

The inherent disadvantages of such methods of manufacture are many.

A separate machine with male and female dies is required to stamp out or form, in a separate operation, each of the many sections comprising the wing or fuselage. Not only are such dies very expensive but a trimming operation is generally required following the stamping of the part.

In addition, the riveting of connections is a hand operation and therefore, a costly one. Rivets are sometimes poorly formed or driven which necessitates a close inspection of all rivets, the removal of the faulty ones, and replacement by others.

Another objection to the use of riveted connections is the considerable wind resistance caused by protruding rivet heads. This can be overcome only through a costly operation of countersinking rivet holes and "flush" finishing of rivet heads.

The resistance spot welding of seams, while increasing in use and popularity in airplane manufacture, possesses disadvantages too.

"Dimples" or depressions in an airplane's surface resulting from electrode pressure in the spot welding operation, cause air turbulence and increased wind resistance just as do protruding rivet heads.

An objection common to both riveting and spot welding is the increased wind resistance caused by the projecting laps of the seams.

On the other hand, a continuously welded seam is impracticable under present methods of manufacture. Excessive warping and distortion develop from the intense heat generated in the welding process. This can be held to a minimum through a careful balance of current, timing, and good cooling, but warping and distortion have not yet been eliminated in the welding of such light gauges of metal such as are used in metal airplane manufacture.

Such warping or distortion of an airplane's surface results in a low aerodynamic efficiency. It also decreases the compressive strength of the structure.

Furthermore, in the welding of high strength heat treated aluminum alloys, the weld is brittle and a zone of annealed metal is formed adjacent to the weld. The resulting connection is of very low strength.

With these and other objects in view, my invention consists in the method and combination hereinafter set forth and claimed, with the understanding that the various elements comprising the airplane or other articles in the manufacture of which my method may be utilized, may be varied somewhat in the shape of the die and the various co-operating parts without departing from the spirit and scope of the appended claims.

In the drawings,

Fig. 3 is a longitudinal section taken vertically through the die of Fig. 1, showing the fuselage of an airplane before the forming operation.

Figs. 4a and 4b are transverse, sectional views taken on the lines 4—4 of Fig. 3. Fig. 4a shows the fuselage before, and Fig. 4b shows the fuselage after forming.

Fig. 5 is a sectional view showing the rudder fin of the fuselage shown in Fig. 3 after forming.

Figs. 6 and 7 show the tail assembly before the forming operation.

Figs. 8 and 9 show the tail assembly during the forming operation.

Figs. 10 and 11 show the formed tail assembly.

Fig. 18a shows a wing before, and Fig. 18b shows a wing after forming.

Figs. 23, 24a and 24b show means for the mechanical lubrication of the interior of the die and for the deep drawing and cutting of a portion of a fuselage shell.

*Fuselage and fin construction*

Figures 1, 2:
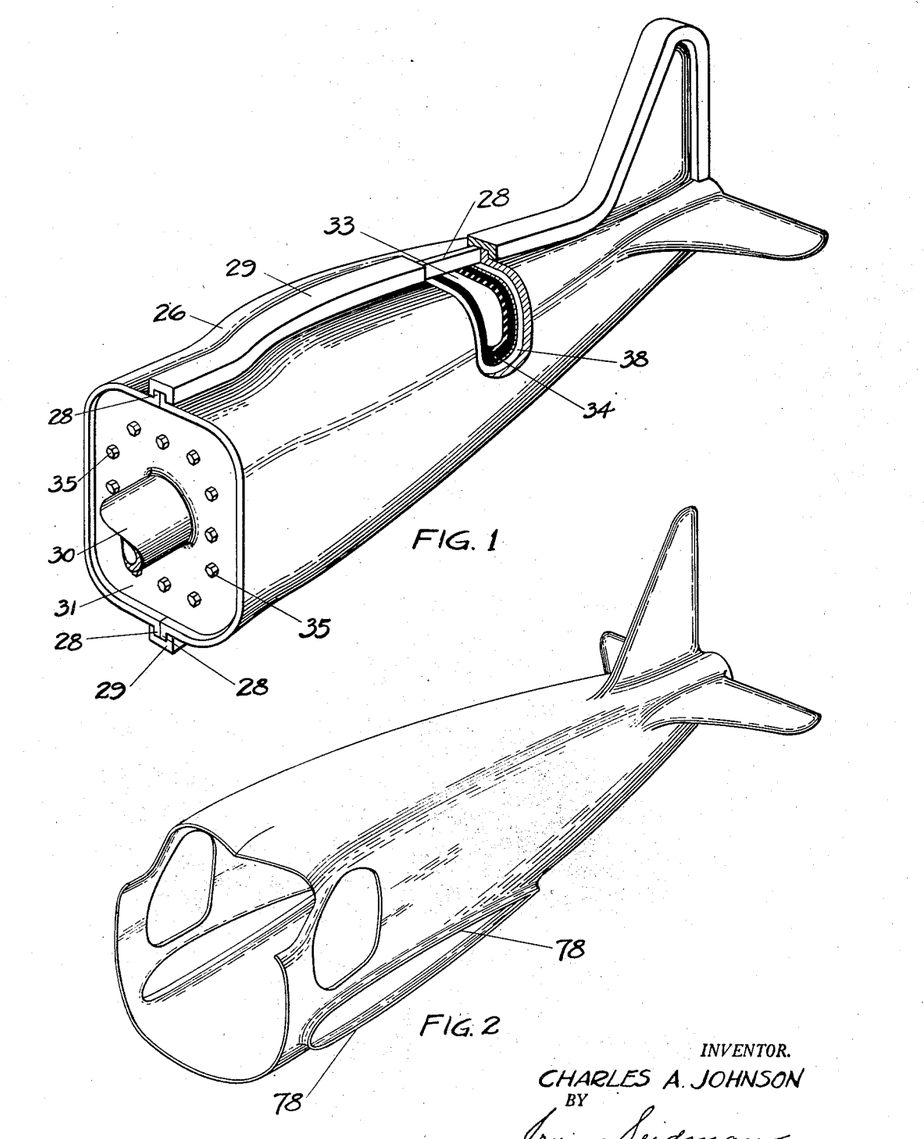
Fig. 1 is a perspective view showing a split die for forming or shaping airplane fuselages with a portion of the die broken away to show in its interior those parts co-operating with the die to form the fuselage.
Fig. 2 is a perspective view showing an airplane fuselage formed by the die of Fig. 1.
Figures 3, 4A, 4B, 5:
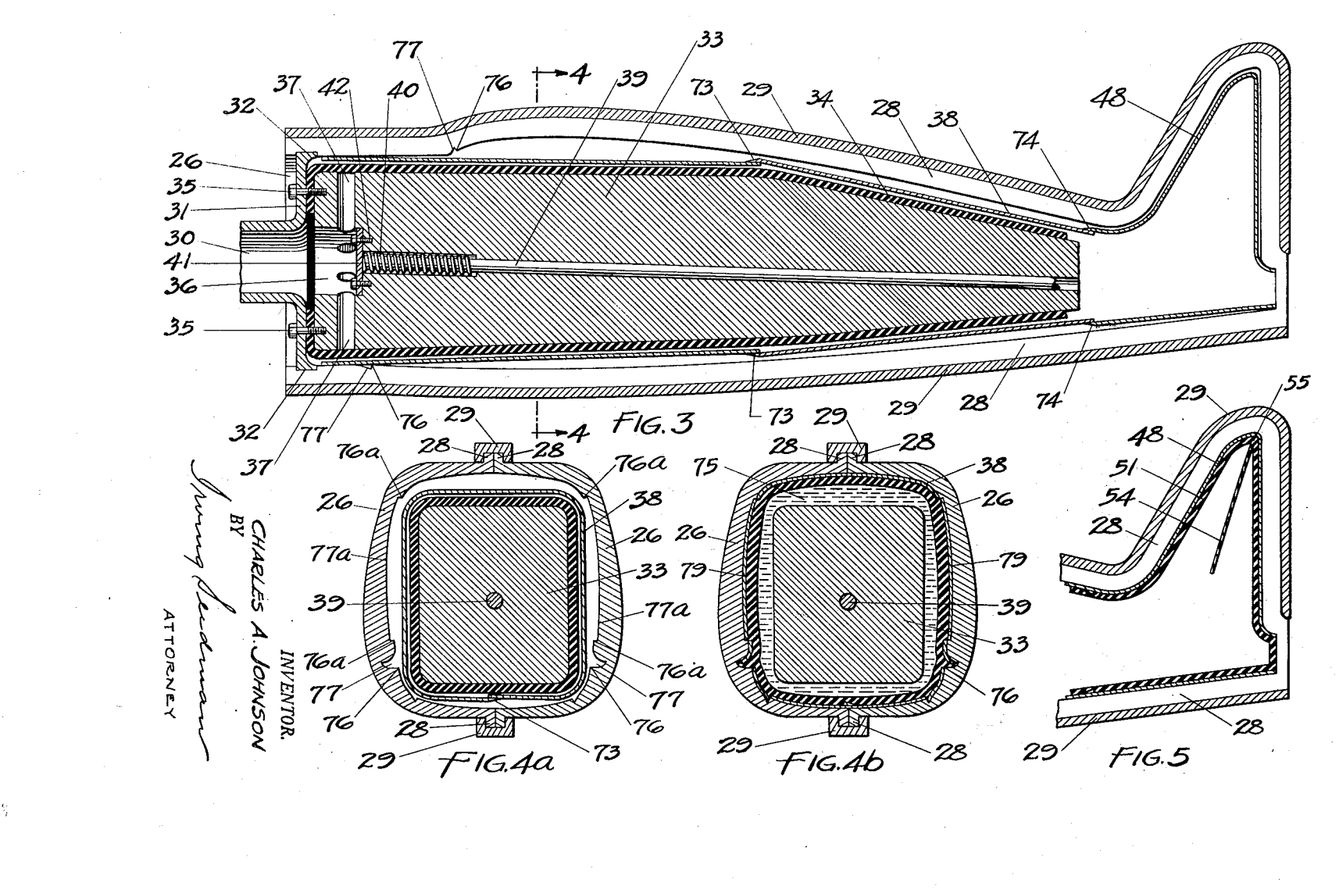

Referring to the drawings, Figs. 1, 4a and 4b show a hollow mold 26, while Fig. 3 shows one-half the mold 26, for forming metal airplane fuselages.

Figure 12:
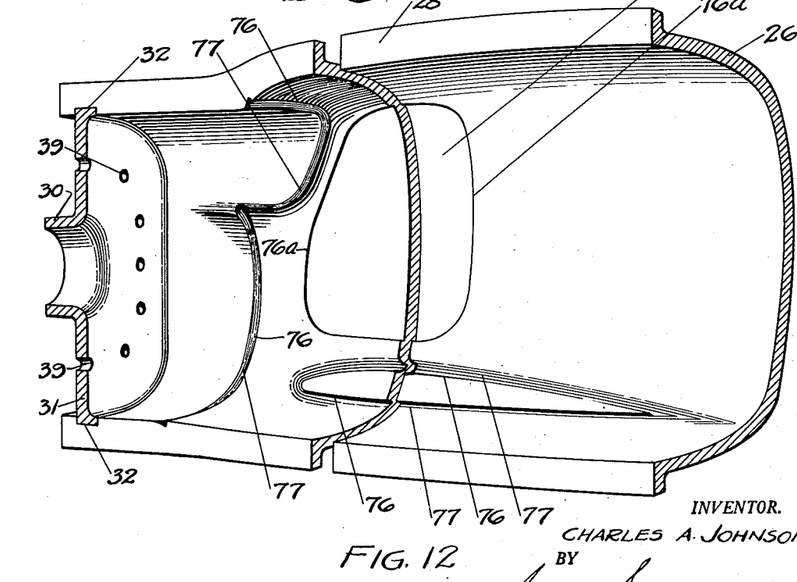
Fig. 12 is a sectional view showing the interior of the forward portion of one-half the die shown in Fig. 1.

In Fig. 12, I show the forward portion of one-half the mold 26, the interior of which has the desired shape or form of the finished fuselage 27, shown in Fig. 2.

In Figs. 1 and 3 to 12 inclusive, are shown flanges 28 on both halves of the mold 26 which run longitudinally around the mold.

Figs. 1, 3, 4a, 4b and 5 show clamps 29 fitting over the flanges 27 to secure the halves of the mold 26 together, when properly mated, as shown in Figs. 1, 4a and 4b.

In Figs. 1, 3 and 12, I show a pipe 30 with a flange or face plate 31 fitting a groove 32 running around the mold 26 as shown in Figs. 3 and 12.

Figs. 1, 3, 4a and 4b show a block 33 enclosed within a sheath or casing 34 made of an elastic material, such as rubber, and fitting close to the block 33 forward of the tail section.

To best illustrate the operation of my invention, I have omitted showing in Fig. 3 the tail section of the elastic sheath 34 and the block 33 with the interior mechanism.

For the same reason the tail section of the block 33 with the interior mechanism has been omitted in Fig. 5. This is shown with the tail section of the sheath 34 in enlarged sectional views 6 to 11 inclusive, and will be described later.

Referring to the drawings, Fig. 3 shows the block 33 compressing the sheath 34 against the face plate 31 by means of bolts 35 to form a fluid tight joint between both surfaces of the casing 34 in the area of the face plate 31. To further insure a tight joint a suitable cement or bonding agent may be used.

Also shown in Fig. 3 is a large hole 36 passing through the sheath 34 and extending part way into the block 33. Radiating from the hole 36 to the surface of the block 33 are several smaller holes 37 communicating with hole 36.

Shown in Figs. 1, 3, 4a and 4b is a thin hollow metal form 38.

Shown in Figs. 3, 4a and 4b, and 6 to 11 inclusive, is a shaft 39 running through the length of the block 33, free rotation of which shaft is prevented by its connection to a torsion spring 40 shown in Fig. 3. The spring 40 is also connected to a plate 41 attached to block 33 by means of bolts 42.

Figures 6, 7:
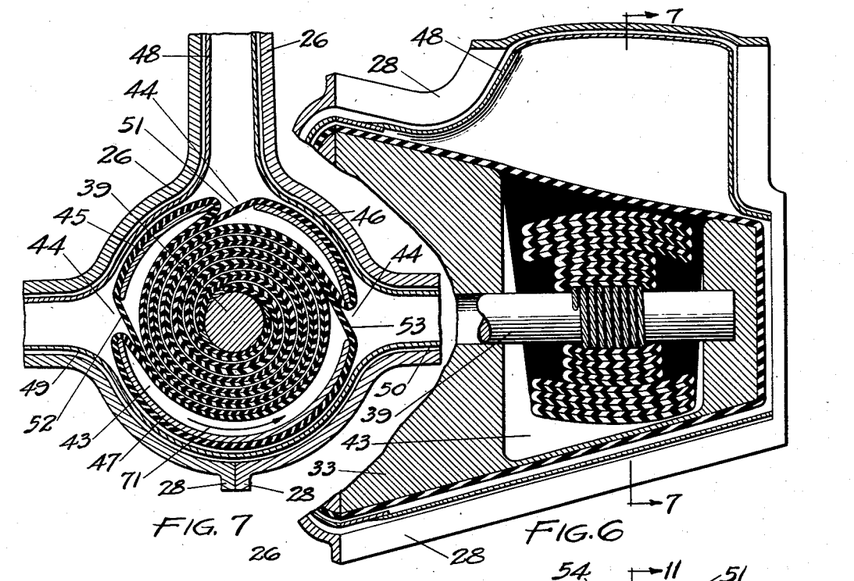
Figs. 6, 8 and 10 are enlarged sectional views showing a portion of the die and the rudder fin of the fuselage shown in Fig. 3 along with the means for forming the same.
Figs. 7, 9 and 11 are sectional views taken, respectively, on the lines 7—7, 9—9, and 11—11 of Figs. 6, 8 and 10.
Figures 8, 9:
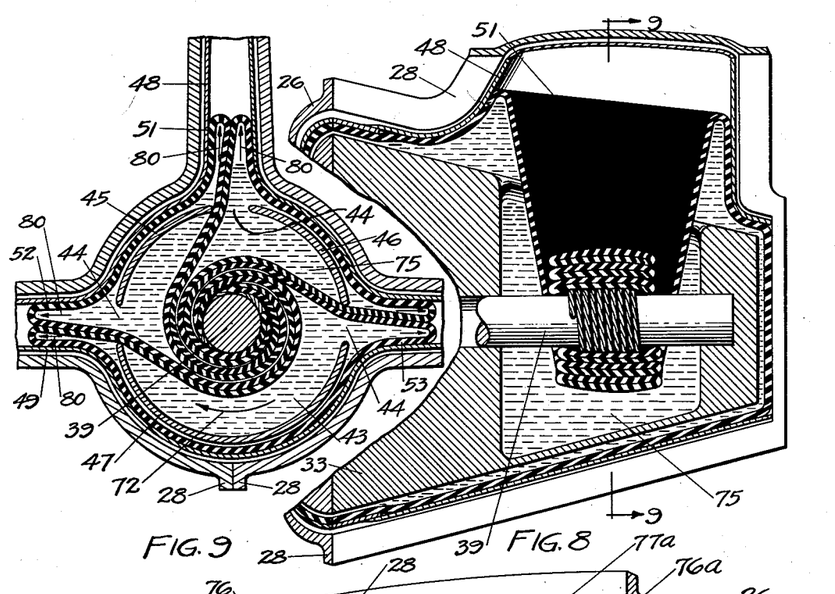
Figures 10, 11:
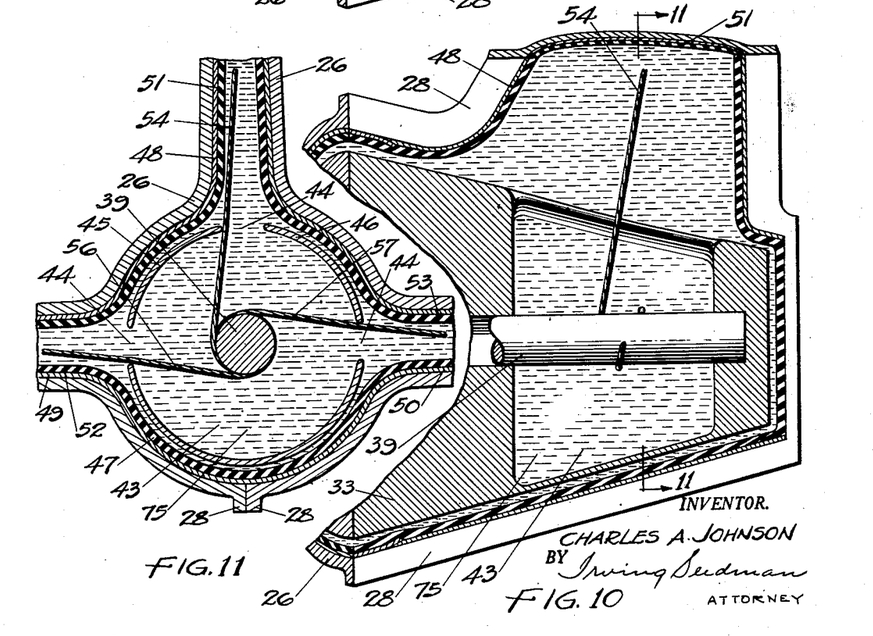

In Figs. 6 to 11 inclusive the block 33 is hollowed at 43 and slotted at 44 the length of the hollow 43. Thus three thin walls 45, 46 and 47 are formed around the hollow 43 as shown in Figs. 7, 9 and 11.

Figs. 3 and 5 show the vertical fin 48, a portion of which is shown in Figs. 6, to 10, inclusive.

In Figs. 7, 9 and 11, I show a portion of the fin 48 and a portion of the horizontal fins 49 and 50. To assist in forming these fixed tail surfaces 48, 49 and 50, the sheath 34 terminates its tail section into thin hollow fins or bladders 51, 52 and 53, of such shape and size as to fit loosely and nearly fill the interior of the preformed fixed tail surfaces 48, 49 and 50.

In Fig. 5 is shown bladder 51 expanded under forming pressure, the nature of which will be described later. 54 is a rope or flexible metal cable attached to the tip 55 of the bladder 51. Cables 56 and 57 shown with cable 54 in Figs. 6, 8, 10 and 11, are likewise attached respectively to bladders 52 and 53.

From the fully expanded positions of the bladders 51, 52 and 53 as shown in Fig. 11, the cables 54, 56 and 57 are attached at their respective ends 58, 59 and 60 to the shaft 39.

Although the method of forming the bladders 51, 52 and 53 along with the sheath 34 is not tail surfaces 48, 49 and 50, as shown in Figs. 5, 10 and 11. The shell 38 with the fixed tail surfaces 48, 49 and 50 having been formed and the necessary openings cut, the pressure is released.

The stored energy of the torsion spring 40 shown in Fig. 3, then rotates the shaft 40 in the direction shown by the arrow 71 of Fig. 7, to roll the cables 54, 56 and 57, followed by the bladders 51, 52 and 53, upon the shaft 39. The bladders 51, 52 and 53 in rolling upon the shaft 39 along with the contraction of the sheath 34 force the fluid 75 from the apparatus mold and the sheathed block. The fuselage metal will then age at room temperature to its maximum strength.

*Wing construction*

Figures 15, 16:
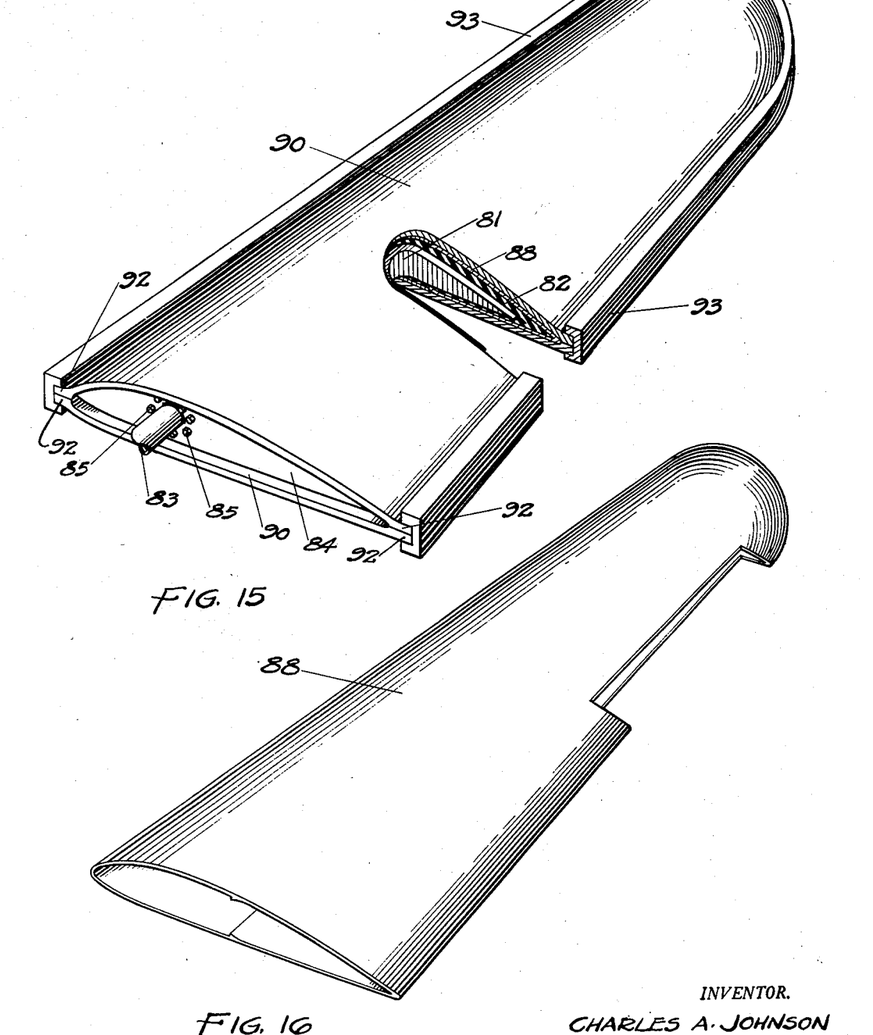
Fig. 15 is a perspective view showing a split die for forming or shaping an airplane wing, with a portion of the die broken away to show in its interior those parts co-operating with the die to form the wing.
Fig. 16 is a perspective view showing an airplane wing formed by the die of Fig. 15.
Figure 17:
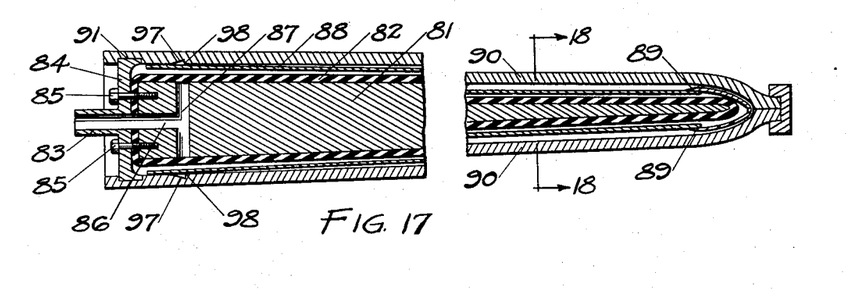
Fig. 17 is a fragmentary sectional view taken vertically through the die of Fig. 15 showing a wing of an airplane before the forming operation.

Referring to the drawings, Figs. 15, 17, 18a and 18b show a metal block 81 covered by a sheath 82 made of the elastic material of casing 34 described above. Shown in Figs. 15 and 17 is a pipe 83 with a flange or face plate 84 attached by means of bolts 85 to the block 81 to compress the sheath 82 against the block 81 as shown in Fig. 17. 85 is a hole passing through the sheath 82 and partly into the block 81, while 87 is a hole passing through the block 81 and through hole 86 as shown in Fig. 17.

Figure 18A:
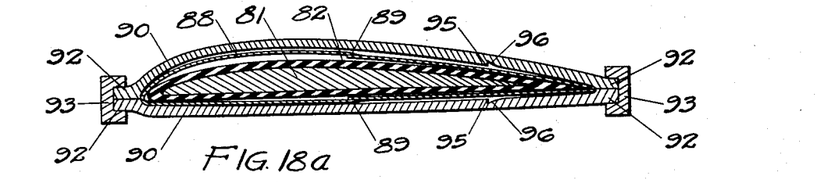
Figs. 18a and 18b are sectional views taken on the lines 18—18 of Fig. 17.

A Duralumin form or shell 88 is placed over the sheath 82 as shown in Figs. 15, 17 and 18a. The form or shell 88 is of the approximate shape but smaller than that of the finished wing 88 shown in Fig. 16, with its section seams 89 welded, "worked," rolled, and beveled as shown in Figs. 17 and 18a, and the shell 88 solution heat treated as described above.

Figures 18B, 19, 20, 21, 22:
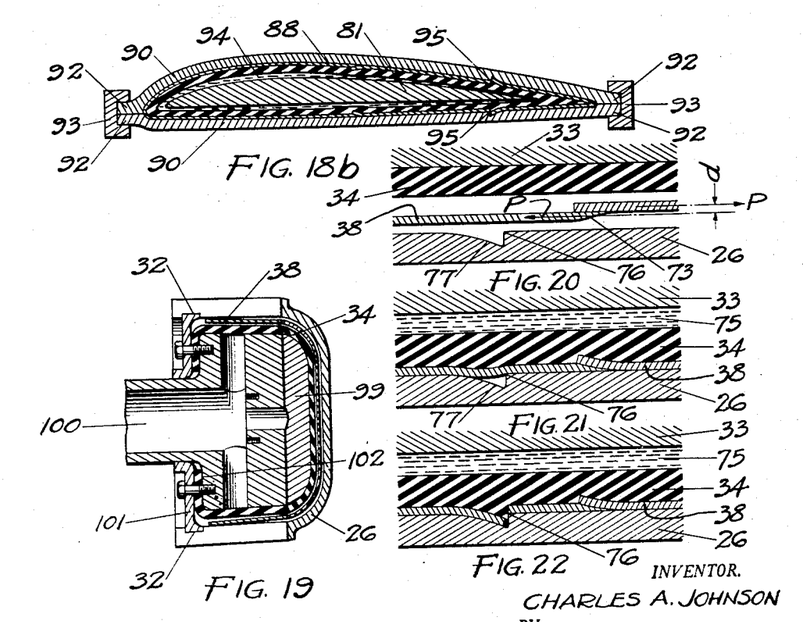
Fig. 19 is a sectional view of the forward end of one-half the die of Fig. 1, showing an alternate arrangement of the parts shown in the forward end of Fig. 3.
Figs. 20, 21 and 22 are sectional views showing the forces involved in forming an airplane fuselage or wing in the way of a welded seam that has been previously beveled on its outer side. These sections also show the progressive stages in cutting the metal.

Referring to the drawings, Figs. 16, 17, 18a and 18b show a mold 90 split longitudinally into two parts. The interior of the molds 90 has the shape of the finished wing 88 shown in Fig. 16, with a groove 91 around its interior as shown in Fig. 17. Passing around the mold 90 are flanges 92 as shown in Figs. 15, 18a and 18b.

To form the shell or wing 88, the mold 90 is placed over the form or shell 88, the face plate 84 fitting into the groove 91 as shown in Fig. 17. The two parts of the mold 90 are then secured together by clamps 93 engaging the flanges 92 as shown in Figs. 15, 18a, 18b.

Fluid 94, preferably water, is then forced through the pipe 83, and the holes 86 and 87 to expand the sheath 82 which in turn expands the shell 88 against the interior surfaces of the mold 90 as shown in Fig. 18b. A further increase in pressure forces the shell 88 against the cutting edges 95 of the groove 96 as shown in Figs. 18a and 18b to cut the metal to form an opening for an aileron (not shown). Fig. 17 shows a groove 97 with a cutting edge 98 for trimming the root of the shell 88.

The forming of the wing 88 having been completed, the pressure is released, whereupon the sheath 82 contracts to force the fluid 94 from the apparatus, after which the formed wing 88 shown in Fig. 16 is removed from the apparatus.

In Fig. 19, I show the forward portions of a block 99, sheath 34, shell 38 and half of the mold 26. The block 99 differs from the block 33 shown in Fig. 3 in that a pipe 100 forms an integral part of the block 99. It is otherwise the same. A ring 101 fitting into the groove 32 of the die 26 is connected by means of bolts 35 passing through the sheath 34 to the face 102 of the block 99.

The primary function of the bolts 35 is to keep the mold 26 in proper relationship to the block 99, by preventing rotation of the ring 101 about the pipe 100. The pressure exerted by the bolts 35 on that portion of the sheath 34 between the ring 101 and the face 102 of the block 99 amounts to only a small part of the total pressure on the above mentioned portion of the casing. It will, therefore, be disregarded in order to better understand the effect of the major forces involved in the operation of the apparatus. A further clarification and simplification results when the sheath 34 and the shell 38 are thought to be removed and the mold 26 forming with the ring 101 a fluid-tight container free to move in a fore and aft or horizontal direction on the pipe 100, with no loss of pressure between the ring 101 and the pipe 100. It will be perceived that this hypothesis is valid in that it reproduces in effect the major forces involved in the operation of the apparatus.

A force equal to the product of the pressure and the area of the face 102 of the block 99 tends to move the block 99 to the right. A force equal to the product of the pressure and the total frontal area of the block 99 (which includes the area of the pipe 100) tends to move the block 99 to the left. The difference amounts to a force equal to the product of the pressure and the area of the pipe 100. By "area of the pipe 100," I mean the area of the circle whose diameter is that of the external diameter of the pipe 100.

Thus it is seen in referring to Fig. 19, that in the operation of the apparatus, a force varying with the pressure acts to compress the sheath 34 between the ring 101 and the face 102 of the block 99.

If so desired, a suitable cement or bonding agent may also be used on the surfaces of the above mentioned portion of the casing.

In Figs. 20, 21 and 22 are shown enlarged sectional views of a portion of the block 33, sheath 34, the solution heat treated shell 38, and mold 26, with the cutting edge 76 of the groove 77. At 73 is a seam, welded, "worked" rolled, and beveled prior to heat treatment of the shell 38.

Fig. 20 shows the shell 38 before forming.

In Fig. 21, I show the sheath 34 expanded by the fluid 75 under pressure. The expansion of the sheath 34 against the shell 38 creates tensile stresses in the shell 38 on both sides of the beveled seam 73. The lines of action of the resultants of these stresses pass through the centers of gravity of the sections, that is, through the center of the material of the shell 38. The resultants of these stresses designated as "P," shown in Fig. 30, are of equal magnitude and opposite direction, at a distance $d$ apart. Thus resultants P constitute a couple of moment $Pd$.

Since the material of the shell 38 is thin, and therefore, of low flexural strength, an increase in the pressure upon the sheath 34 will produce higher stresses within the shell 38 resulting in a progressive decrease in $d$ until the shell in the way of the beveled seam 73 becomes straight as shown in Figs. 21 and 22. A second factor tending to straighten the material in the way of the seam 73 is the direct pressure of the sheath 34 upon the shell 38, resulting in the flattening of the material in the way of the seam 73, against the mold 26.

As shown in Figs. 21 and 22, the cutting of the shell 38 results from the pressure of the sheath 34 upon the shell 38 creating a tension in the shell 38 above the groove 77 in combination with a concentration of shearing stress in the shell intended as part of my invention as set forth in the appended claims, it may nevertheless prove helpful to describe such a method.

Figures 13, 14:
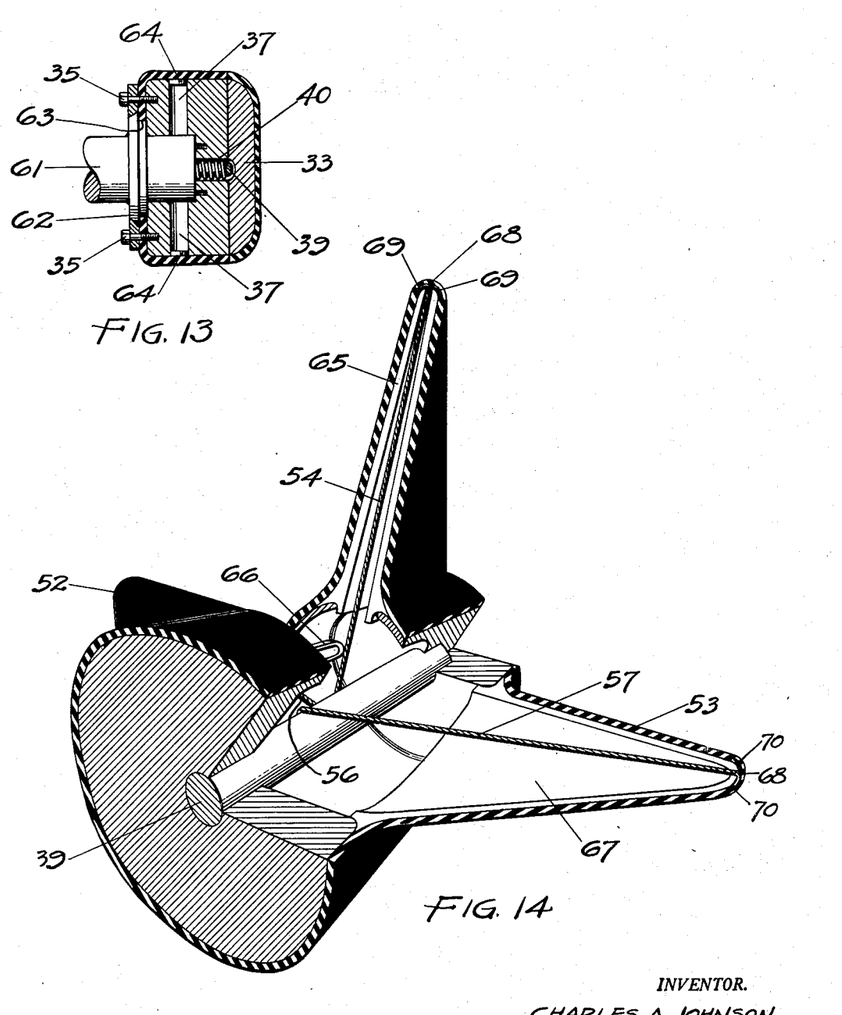
Figs. 13 and 14 are sectional views illustrating a method of making one of the parts of my invention.

In Fig. 13, I show the forward portion of the block 33 with the shaft 39 inserted and the torsion spring 40 attached only to the shaft 39, which is thus free to rotate but is restrained from motion in a fore and aft direction by a shaft 61 fitted into the hole 36 (shown in Fig. 3) of the block 33. Shaft 61 is provided with a flange 62 shouldered at 63 to a depth equal to the desired thickness of the sheath 34 and is secured to the block 33 by means of bolts 35 (shown in Fig. 3). Holes 37 are plugged by thin discs 64 made preferably of plaster of Paris.

Fig. 14 shows the tail end of the block 33 with the shaft 39 and the cables 54, 56, and 57 attached thereto. 65, 66 and 67 are thin walled hollow forms made preferably of plaster of Paris, upon which may be deposited rubber latex or the like to form the bladders 51, 52 and 53. Cables 54, 56 and 57 are threaded through the tips 68 of the forms 65, 66 and 67, after which the forms 65, 66 and 67 are securely socketed into the slots 44 of the block 33 (shown in Figs. 7, 9 and 11).

The cables 54, 56 and 57 are next cut to the desired length and the strands unraveled extending beyond the tips 68 of the forms 65, 66 and 67. The unraveled strands are then bent back close to the surface of the forms 65, 66 and 67 to anchor the cables 54, 56 and 57 to the sheath 34, as shown at 69 and 70.

The block 33 with its attached forms 65, 66 and 67 is then dipped into a bath of rubber latex or the like and the operation repeated until the sheath 34 and bladders 51, 52 and 53 have been built to the desired thickness.

After the sheath 34 and bladders 51, 52 and 53 have been thoroughly dried, the shaft 61 (shown in Fig. 13) is removed from the block 33, and the block 33 is then attached to the face plate 31 by means of bolts 35 (shown in Fig. 3). Block 33 is next placed in a vertical position with the tail end up and the casing 34 inflated, preferably by air, through pipe 30. The forms 65, 66 and 67 are broken into small pieces within the bladders 51, 52 and 53. These pieces of plaster having been shaken to the downward and forward end of the block 33 may then be removed along with the plaster discs 64 merely by disconnecting the face plate 31 and stretching the sheath 34 away from the forward end of the block 33. The block 33 is then placed in a vertical position with the tail down and the bladders 51, 52 and 53 inflated by water poured through the hole 36 of the block 33.

Following this, the plate 41 is connected to the torsion spring 40 (shown in Fig. 3), and the shaft 39 rotated through the spring 40 by rotating the plate 41 in the direction shown by the arrow 71 shown in Fig. 7. Thus the cables 54, 56 and 57 followed by the bladders 51, 52 and 53 pulling against the water pressure indicated by the arrows 72 of Fig. 9, are rolled onto the shaft 39.

With the bladders 51, 52 and 53 tightly wound about the shaft 39 as shown in Fig. 7, the plate 41 is then secured to the block 33 by means of bolts 42 as shown in Fig. 3.

Following this, the face plate 31 is attached to the block 33 by means of bolts 35 as shown in Fig. 3, and the apparatus is then ready for use.

Disc 64 and forms 65, 66 and 67 may also be made of gelatine. The sheath 34 and the bladders 51, 52 and 53 are formed by dipping into a bath of rubber latex, or the like, as described above.

After the sheath 34 and bladders 51, 52 and 53 have been thoroughly dried, the sheath 34 is inflated with hot water and the block 33 immersed in hot water to dissolve the gelatine discs 64 and gelatine forms 65, 66 and 67.

In the preferred practice of my invention, the airplane is made of Duralumin. For a fuselage such as shown in Fig. 3, the sections comprising the shell are cut from annealed Duralumin and formed on a bending brake. They are then placed in position on a jig (not shown) of a shape similar to that of the block 33 shown in Fig. 3, and resistance spot welded to each other only where necessary to hold the sections in position. The jig has upon its surface bars or platens of hard copper alloy and are located under the lapped joints or seams of the sections. The purpose of the platens is to carry the electric current used in welding the seams.

The seams 73, shown in Figs. 3 and 4b, are resistance welded continuously throughout their length by means of a hard copper alloy roller electrode.

Following the welding electrode is another roller carrying an electric current of less than a welding amperage to apply heat and pressure to "work" the welded seams 73 to refine the grain structure of the weld metal. I term this a "work" rolling operation.

Following the "working" roller is a milling cutter used to bevel the seams 73.

The sections comprising the fins 48, 49 and 50 shown in Figs. 3, 5, and 7 to 11 inclusive, are formed to their approximate finished shape, after which their seams are welded, "work" rolled, and beveled as in the case of the shell. The fins 48, 49 and 50 are then welded to the fuselage form at 74, the seams being "worked" and beveled as described above and shown in Fig. 3.

These operations are continuous in that they follow each other in rapid order.

The shell or form is then solution heat treated, after which it is placed over the sheath block 33 as shown in Figs. 3 and 4a. The halves of the mold 26 are brought together, the face plate 31 fitting into the groove 32 of the mold 26 as shown in Fig. 3. The halves of the mold 26 are then secured together by clamps 29 as shown in Figs. 3, 4a and 4b. Referring to Fig. 3, a fluid 75, preferably water, is forced under pressure through pipe 30, and holes 36 and 37, to expand the casing 34 against the shell or form 38. In this way shell 38 is in turn expanded to take the shape of the interior of the mold 26 as shown in Fig. 4b.

Further pressure is then applied to force the shell 38 against the cutting edges 76 of the grooves 77 and against the cutting edges 76a of the recesses 77a, shown in Figs. 3, 4a, 4b and 12 to part the metal along the cutting edges 76 and 76a as shown in Fig. 4b, to form the opening for the windshield, doors, flanges 78 to engage the wing and other necessary holes as shown in Fig. 2. Thus door panels 79 are also formed.

Simultaneously, the fins 48, 49 and 50, are formed as shown in Figs. 5, and 6 to 11 inclusive. The fluid 75 exerts a pressure on the bladders 51, 52 and 53 as indicated by the arrows 80 shown in Fig. 9, which rotates the shaft 44 in the direction of the arrows 72. The rotation of the shaft 44 reacts against the torsion spring 40 shown in Fig. 3. With an increase in pressure the bladders 51, 52 and 53 expand to expand in turn the fixed 38 along the cutting edge 76. These combined stresses serve to part or cut the shell 38 along the cutting edge 76.

In the same way, the door panel 79 shown in Fig. 4b is cut from the shell 38.

In the same manner, as described above, is accomplished the straightening of the material in the way of the beveled seams 89 and the cutting of the wing shell 87 shown in Figs. 17, 18a and 18b.

Figure 23:
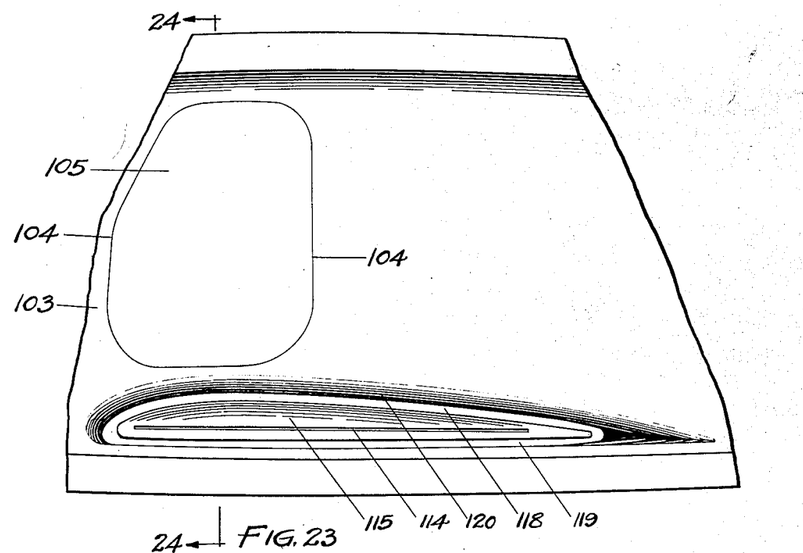
Fig. 23 is a view showing the interior of a portion of one-half a die.
Figure 24A:
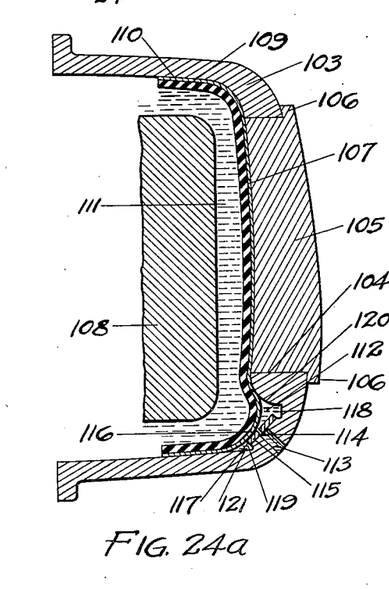
Figs. 24a and 24b are sectional views taken on the lines 24—24 of Fig. 23 and show in addition co-operating apparatus within the die.
Figure 24B:
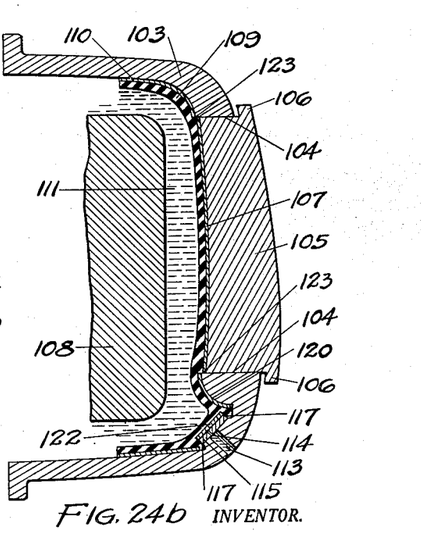

In Figs. 23, 24a and 24b, I show a mold 103 cut at 104. Fitting closely within the door shaped opening thus formed is a movable section 105 limited in inward motion by a flange 106 around the periphery of the movable section 105 and bearing against the mold 103 to form with its face 107 a "fair" surface with the interior of the mold 103 as shown in Fig. 24a.

In Figs. 24a and 24b are shown portions of the block 108, sheath 109 and shell 110, all of which are similar to the block, sheath, and shell previously described and shown.

The sheath 109 is inflated by the pressure of a fluid 111 to expand the shell 110 against the wall of the mold 103 and the face 107 of the movable section 105, the air between the shell 110 and mold 103 escaping between the fairing surfaces of the flanges on the half molds.

At this point a liquid lubricant 112 is forced into the hole 113 of the mold 103 passing through a narrow slot 114 in a shaped plate 115 to thoroughly lubricate the interior of the mold 103.

Increased pressure draws the shell 110 to form a bulge 116 forcing the lubricant 112 to flow between the shell 110 and the interior of the mold 103, the lubricant 112 escaping between the fairing surfaces of the flanges on the half mold.

Further increase in pressure further expands the bulge 116 until the shell 110 is cut along the cutting edges 117 adjacent to the grooves 118 and 119 to form the shell upon the fairing shaped surfaces 120 and 121 of the mold 103, leaving a scrap piece 122 pressed against the plate 115 as shown in Fig. 24b.

The movable section 105 is then moved outwardly to provide cutting edges 123 on which the shell 110 is cut to form an opening for a door while simultaneously forming a door panel 124.

Except for the portion described above, the mold 103 is similar to the mold 26 shown in Figs. 1 and 3 to 11 inclusive. However, mold 26 would be unsuitable for the forming of a deep drawn fairing section such as described above, because of the tendency of the shell to tear on the sharp cutting edges 76a of recess 77a shown in Figs. 4a, 4b and 12.

It will thus be seen that in addition to affording a novel and efficient method of forming hollow members into desired shapes and forms, the same means and method may be employed for punching out pieces of metal therefrom; that by my means and method an airplane fuselage together with wing roots and vertical and horizontal fins may be turned out as a unit through a single expanding or forming operation; that, in addition, the same process and means enables me to punch out windows, doors, etc. simultaneously with the "formation" of the fuselage. Employing substantially the same means and method, whole wing sections may be "formed," as well as other parts or portions of airplanes.

While I have shown and described my method of forming all welded metal airplanes, I wish it understood that I do not confine myself to the precise details of construction as hereinabove set forth by way of illustration, or the precise method as thereinabove set forth, for it is apparent that changes and variations may be made, not only in the structure but in some details of the method. Although I have shown a fuselage and wing with smooth exteriors, my invention is not limited to this design. For example, load-carrying elements such as ribs, corrugations, or the like, may be formed upon the fuselage and wings. Neither do I want to limit myself to the manufacture by my method of airplanes alone, since this method may be used in forming other objects of thin welded metal. Any variations that may be made without departing from the spirit of the invention is contemplated by the appended claims.

I claim:

1. In combination, a hollow mold having an opening in a wall thereof circumscribed by cutting edges, a movable section fitting into said opening, a preformed block encased by an elastic sheath disposed within said mold, and means for inflating said sheath with a fluid under pressure whereby said sheath will expand a metal shell into conformity with the inside of the mold and where said shell comes into contact with the cutting edges of said opening, the metal thereof is severed to remove a part corresponding to the opening, the movable section being moved outwardly by the operation to provide the said cutting edges.

2. In combination, a hollow mold provided with hollow fins, a preformed block encased by an elastic sheath disposed within said mold, said block having a deep hollow with slots in the body thereof in juxtaposition to said hollow fins, and said sheath having communicating bladder appendages in number corresponding to the number of fins, a revoluble shaft extending through said block and across said hollow, means for rotating said shaft and means connecting said bladders to said shaft whereby the bladders may be wound on said shaft, and means for inflating said sheath and bladders with a fluid under pressure.

3. The combination in accordance with claim 2, wherein the block is provided with a main communicating passage extending from the fluid supply means and auxiliary passages extending to the inside of said sheath.

CHARLES A. JOHNSON.